United States Patent [19]

Matsuda

[11] 4,392,202
[45] Jul. 5, 1983

[54] METHOD AND APPARATUS FOR ANTI-SKID BRAKE CONTROL OF AN AUTOMOTIVE VEHICLE

[75] Inventor: Toshiro Matsuda, Yokohama, Japan

[73] Assignee: Nissan Motor Company, Limited, Kanagawa, Japan

[21] Appl. No.: 195,313

[22] Filed: Oct. 8, 1980

[30] Foreign Application Priority Data

Oct. 9, 1979 [JP]  Japan ........................... 54-129374

[51] Int. Cl.³ ..................... B60T 8/08; G05D 13/02
[52] U.S. Cl. ................................ 364/426; 303/93; 303/109
[58] Field of Search ............ 364/424, 426, 565; 303/20, 91, 93, 100, 105, 109

[56] References Cited

U.S. PATENT DOCUMENTS

| | | | |
|---|---|---|---|
| 3,578,819 | 5/1971 | Atkins | 303/106 |
| 3,604,760 | 9/1971 | Atkins | 303/109 |
| 3,612,622 | 10/1971 | Riordan | 303/109 |
| 3,709,565 | 1/1973 | Jonason et al. | 303/109 |
| 3,718,374 | 2/1973 | Ochia | 364/426 X |
| 3,744,849 | 7/1973 | Jonason et al. | 303/109 |
| 3,752,536 | 8/1973 | Machek | 303/115 |
| 3,758,167 | 9/1973 | Machek | 303/118 |
| 3,827,760 | 8/1974 | Fleagle | 303/106 |
| 3,833,268 | 9/1974 | Fleagle | 303/106 |
| 3,897,114 | 7/1975 | Scharlack | 303/110 |
| 3,930,688 | 1/1976 | Rau et al. | 364/426 X |
| 3,944,289 | 3/1976 | Jones | 303/20 X |
| 3,944,291 | 3/1976 | Lindemann et al. | 303/20 X |
| 3,985,396 | 10/1976 | Kuwana et al. | 364/426 |
| 3,998,496 | 12/1976 | Bernabo et al. | 303/106 |
| 4,006,942 | 2/1977 | Saito | 303/109 |
| 4,036,536 | 7/1977 | Quon | 303/105 |
| 4,043,608 | 8/1977 | Bourg et al. | 303/104 |
| 4,094,556 | 6/1978 | Okamoto et al. | 303/109 |
| 4,285,042 | 8/1981 | Ohmori et al. | 364/426 |
| 4,308,583 | 12/1981 | Musolino et al. | 364/426 |

FOREIGN PATENT DOCUMENTS

| | | | |
|---|---|---|---|
| 55-156750 | 12/1980 | Japan | 364/426 |
| 1235016 | 9/1971 | United Kingdom | |
| 1420034 | 7/1976 | United Kingdom | |

*Primary Examiner*—Felix D. Gruber
*Attorney, Agent, or Firm*—Lowe, King, Price & Becker

[57] ABSTRACT

Disclosed is a method and apparatus for controlling application and release of brake pressure in automotive vehicle brakes in order to prevent the vehicle from skidding. The system has a component for determining the coefficient of friction between the road surface and a tire tread, operative to determine that coefficient as a function of the wheel acceleration, wheel load and brake torque. Additionally there is provided a circuit for detecting a peak of the friction coefficient during a control cycle, as well as circuitry for determining wheel r.p.m. and for determining target wheel r.p.m. The latter function is performed on the detected wheel r.p.m. responsively to detection of the peak of the friction coefficient. Additionally, a control device is provided for controlling applying and releasing of fluid pressure to wheel cylinders for skid controlling the rate of wheel deceleration. The target wheel r.p.m. determining circuit determines a deceleration coefficient of wheel r.p.m. based on the difference of wheel r.p.m. between the time of detecting the peak of the friction coefficient and the time of detecting the immediately preceding peak, and the length of the interval between detecting the peaks. The circuit determines the target wheel r.p.m. by subtracting a time varying amount, obtained as a function of the determined deceleration coefficient, from the wheel r.p.m. determined at the time of detecting of the peak of the friction coefficient.

15 Claims, 11 Drawing Figures

METHOD AND APPARATUS FOR ANTI-SKID BRAKE CONTROL OF AN AUTOMOTIVE VEHICLE

BACKGROUND OF THE INVENTION

The present invention relates generally to a brake control system for an automotive vehicle to prevent the vehicle wheels from skidding upon a rapid application of a brake force. More specifically, the invention relates to a brake control system for controlling the rate of deceleration of the vehicle wheel rotation relative to vehicle speed and corresponding to friction between the tire tread and road surface.

Upon braking of a moving vehicle and the like, such as an automotive vehicle, a vehicle wheel is apt to lock, thereby causing skidding. This will necessarily create an unstable condition in the controlled motion of the vehicle. Wheel lock-up may cause such a loss in directional stability as to result in an uncontrolled skidding while at the same time the presence of locked wheels generally increases the distance required to stop. The increased stopping distance is due to a reduced coefficient of friction while skidding under most road conditions. If skidding can be prevented, the vehicle can usually be stopped more safely in a shorter distance. Therefore, various brake control systems have been developed for preventing the wheels from locking, thereby preventing the vehicle from skidding. General and typical construction of such a brake control system has been described in U.S. Pat. No. 3,897,114, entitled "SKID CONTROL SYSTEM" to Ronald S. Scharlork. The U.S. Patent discloses a brake control system for controlling the braking of a wheeled vehicle to prevent skidding. The system, which provides relief of the braking force applied to the vehicle wheel, is effectively responsive to a critical slip signal. The slip signal is generated in response to a sensed difference between a hypothetical vehicle deceleration, as approximated by a decreasing ramp signal, and the vehicle wheel speed. The comparison is made on a differential basis to provide an output signal which is utilized in controlling an output gate. The braking force is reapplied upon the sensing of a positive wheel acceleration signal and a change in the sign of the rate of change of wheel acceleration from a positive to a negative value. During this period, the skid signal is ineffective to control the brake force.

As is known to those skilled in the art, when rapid braking is applied to a vehicle, a maximum braking effect can be obtained by providing approximately a 15% slip rate for the vehicle wheel with respect to the road surface, since the friction between the wheel tread and road surface is maximized at that time. Accordingly, upon rapid brake operation, it is preferable to control wheel r.p.m. relative to the vehicle speed so that it becomes about 15% lower than the vehicle speed. Namely, the brake control system operates to control the deceleration rate of the wheel r.p.m. with respect to the vehicle speed so that the wheel r.p.m. is not excessively decelerated relative to the vehicle speed. Such operation is provided to avoid locking of the wheels and resultant slipping on the road surface. In practice, when the wheel r.p.m. is decelerated to be about 15% lower than the vehicle speed, a target wheel r.p.m. is determined based on the wheel r.p.m. and a predetermined friction coefficient. Corresponding to the determined target wheel r.p.m., the deceleration rate of the wheel r.p.m. is controlled to change the actual wheel r.p.m. to approach the target wheel r.p.m. Thus, since the deceleration rate of the vehicle depends on friction between the tire tread and the road surface, the target wheel r.p.m. is determined based on the vehicle speed and the friction coefficient.

In actual operation, the braking fluid pressure applied to the brake device of each wheel, i.e., to each wheel cylinder, is relieved in response to deceleration of the wheel r.p.m. to a lower speed than the target wheel r.p.m. When the wheel speed recovers and exceeds the target wheel r.p.m., the braking fluid pressure is again applied to the brake device of each wheel. By repeating this operation, the vehicle can be gradually decelerated without causing locking of the wheel and therefore without causing wheel skidding on the road surface.

In the conventional system, the friction coefficient between the tire's tread and the road surface is presumed to be a constant value which is determined based on general road surface conditions. However, the actual friction coefficient of the tire tread and the road surface varies, depending on wheel tread wear and the road surface condition. If the actual friction coefficient is different from that of the presumed and predetermined value, the target wheel r.p.m. determined based on the predetermined friction coefficient may not correspond to the actual vehicle speed.

For situations wherein the actual friction coefficient is larger than the predetermined value, the wheel r.p.m. is rather rapidly decelerated to reach a predetermined r.p.m. after a relatively short period from braking operation. At the predetermined wheel r.p.m., the target wheel r.p.m. is determined and the brake control system becomes operative. By entering into the controlled state a relatively short period after applying the brake, the target wheel r.p.m. is determined based on a relatively high vehicle speed. Therefore, the braking distance is longer than that required. To the contrary, if the actual friction coefficient is lower than the predetermined value, it takes a relatively long period to decelerate the wheel r.p.m. to the predetermined target wheel speed value. In this case, the target wheel r.p.m. is determined significantly lower than the vehicle speed to cause possible locking of the wheel.

For effectively and satisfactorily controlling vehicle skid due to the vehicle brake system, it is required to determine the most suitable deceleration rate corresponding to friction between the wheel tread and the road surface. As stated above, the friction between the wheel tread and the road surface is maximized for a wheel decelerating rate approximately 15% lower than the vehicle speed. Therefore, by determining the peak coefficient of friction in each cycle of skid control operation and by controlling the ratio of applying and releasing the brake fluid pressure to the wheel cylinder to correspond to the detected peak of the coefficient of friction, the vehicle braking operation can be effected most effectively and satisfactorily.

SUMMARY OF THE INVENTION

Therefore, it is an object of the present invention to provide a brake control system for an automotive vehicle having a target wheel r.p.m. determining means for determining a target wheel r.p.m. for each cycle of skid control operation, which target wheel r.p.m. is variable corresponding to variation of friction between the tire tread and the road surface.

Another and more specific object of the present invention is to provide a brake control system having a means for detecting a peak in the coefficient of friction in each skid control operation and a means for determining target wheel r.p.m, based on the wheel r.p.m. at the time of detection of the peaks of the friction in the current and an immediately preceding cycle of skid control operation.

To accomplish the above-mentioned and other objects of the present invention, in accordance with a preferred embodiment of the invention there is provided a brake control system having a means for determining the pertinent friction coefficient based on wheel speed acceleration, wheel load and brake torque, a means for detecting a peak of the friction coefficient, a means for determining wheel r.p.m, a means for determining a target wheel r.p.m. based on the wheel r.p.m. and being operative responsive to detection of the peak coefficient of friction, and a control means for controlling applying and releasing of pressure fluid to the wheel cylinders for skid controlling the wheel deceleration rate. The means for determining the target wheel r.p.m. determines the rate of deceleration of wheel speed based on the difference in wheel r.p.m. between the time of detection of the peak of the friction coefficient and the time of detection of the immediately preceding such peak, and on the length of the time period between detection of the peaks. The target speed determining means thus determines the target wheel r.p.m. by subtracting a deceleration incremental value, obtained as a function of the determined rate of deceleration, from the wheel r.p.m. determined at the time of detecting the peak of the friction coefficient.

Other objects and advantages of the present invention will become apparent from the description describing the invention in detail in terms of the preferred embodiments.

BRIEF DESCRIPTION OF THE DRAWINGS

The present invention will become more fully understood from a detailed description thereof provided hereinbelow, and from the accompanying drawings of the preferred embodiments of the present invention which, however, should not be taken as limitative of the present invention but rather only as explanatory and illustrative thereof.

In the drawings.

DESCRIPTION OF THE PREFERRED EMBODIMENT

Figure 1:
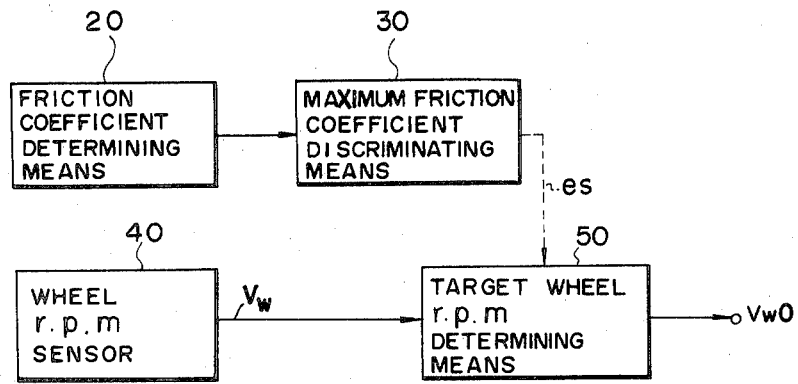
FIG. 1 is a schematic block diagram of a general circuit structure of a brake control system according to the present invention, which shows a fundamental and generic concept of the present invention.

According to the present invention, the preferred embodiment of a brake control system controls application and release of fluid pressure to a wheel cylinder for preventing the wheel from locking and thereby for preventing the vehicle from skidding. In the brake system according to the present invention, timing for releasing of the fluid pressure and thereby for releasing of the brake is determined based upon wheel r.p.m. as determined by a wheel r.p.m. sensor and upon target wheel r.p.m. as determined by a target wheel r.p.m. determining means. A skid control means in the brake control system generates a control signal for actuating a means for relieving fluid pressure in the wheel cylinder when the wheel r.p.m. is decelerated to be equal to or less than the target wheel r.p.m. For this purpose, the skid control means comprises a comparator circuit including differential circuit means for comparing the wheel r.p.m. with the target wheel r.p.m. during the brake application portion of a control cycle for stopping the vehicle and for deriving an output signal when the wheel r.p.m. bears a preselected relationship to the target wheel r.p.m. In the preferred embodiment of the present invention, the target wheel r.p.m. is varied correspondingly to varying of friction coefficient between the tire tread and the road surface. The brake control system further comprises a charge storage device which is supplied with electric energy when a signal representing the wheel speed (r.p.m.) bears a preselected relationship to the charge on the storage device. The preselected relationship will occur when the wheel r.p.m. signal exceeds the charge on the storage device. The anti-skid brake control system further includes a circuit for discharging the storage device when the wheel r.p.m. signal is less than the charge on the storage device. The discharge device causes the discharge of the storage device in accordance with a preselected deceleration relationship to approximate the deceleration of the vehicle. A differential creating circuit means is provided for giving greater effect to the target wheel r.p.m. as compared to the wheel r.p.m. thus to create a differential between the two r.p.m. signals. The differential creating circuit means includes a fixed voltage drop circuit in the target wheel r.p.m. signal generating circuit and a fixed voltage drop circuit in the wheel r.p.m. signal generating circuit. The fixed voltage drop of the target wheel r.p.m. signal generating circuit exceeds that of the wheel r.p.m. signal generator, i.e., the wheel r.p.m. sensor. A means is provided for generating an output signal when the wheel r.p.m. falls to a preselected magnitude below the target wheel r.p.m. to create a critical slip signal. An output circuit controls the application of the brake pressure. The critical slip signal causes the output circuit to provide an output signal to release brake pressure when the critical value is obtained, and a slip circuit disabling means is connected in response to said output circuit. The disabling means operates to disable the slip circuit when the output signal is generated. The critical slip signal thus causes a brake relieving condition which relieves brake pressure on the vehicle wheels. The skid control means of the brake control system further includes a pressure applying circuit means, including a first signal generating means responsive to said wheel r.p.m. for generating a rate of change of wheel acceleration signal and a second circuit means for generating a wheel acceleration signal. An output gate means correlates the rate of change of acceleration signal and the wheel acceleration signal to control the reapplication of brake pressure to the wheels.

Referring now to the drawings, particularly to FIG. 1, there is illustrated a broad and fundamental construction of a preferred embodiment of a brake control system according to the present invention. It will be appreciated that although the entire structure of the control system is not illustrated, the remaining portions of the system, for example a control unit for determining the control ratio to be applied to each wheel cylinder for controlling the brakes in order to reduce the difference between actual and target wheel r.p.m., are well known to those skilled in the art. Therefore, it will be understood that the following portions of the specification describe an improvement in a brake control system achieving advantages and objects sought in the present invention.

Now, referring to FIG. 1, the reference numeral 20 denotes a friction coefficient determining means for determining a coefficient of friction F between a tire tread and the road surface. The friction coefficient determining means 20 generates and outputs an output indicative of the determined friction coefficient. The output of the friction coefficient determining means 20 is fed to a maximum friction coefficient discriminating means 30. The discriminating means 30 determines the peak of friction coefficient for each skid control operation. The discriminating means 30 generates a peak signal $e_s$ for output to a target wheel r.p.m. determining means 50. Also, an actual wheel r.p.m. signal $V_w$, indicative of actual wheel r.p.m. determined by a wheel r.p.m. sensor 40, is input to the target wheel r.p.m. determining means 50. The target wheel r.p.m. determining means 50 calculates a target wheel r.p.m. based on the peak signal $e_s$ and on the wheel r.p.m. signal $V_w$. and generates a target r.p.m. signal $V_{w0}$. The target r.p.m. signal $V_{w0}$ is fed to a known control means for controlling the wheel cylinders.

The friction coefficient determining means 20 comprises suitable known means. For example, variation of wheel r.p.m. of the driving wheel under a skid controlled condition is determined and thereby the friction coefficient can be obtained. The target wheel r.p.m. determining means 50 determines wheel speeds $V_{w1}$ and $V_{w2}$ at those times wherein the friction coefficient F attains a maximum value $F_{max}$ and determines a difference $D_v$ between $V_{w1}$ and $V_{w2}$. Also, the target wheel r.p.m. determining means 50 determines a time difference $D_t$ between times at which the wheel speeds are $V_{w1}$ and $V_{w2}$. The target wheel r.p.m. determining means 50 obtains a deceleration coefficient $-D_v/D_t$ and thereby determines a target wheel r.p.m. $V_{w0}$ which varies linearly with time at an inclination given by the deceleration coefficient $(-D_v/D_t)$ of $V_{w1}$ and $V_{w2}$. The target wheel r.p.m. is determined for each detection of a peak $F_{max}$ of friction coefficient. However, it is preferable to determine the friction coefficient based on wheel r.p.m., wheel load and brake torque according to the manner explained hereafter.

Generally, the motion of vehicle under braking condition can be described by the following equation.

$$I \cdot \frac{da}{dt} = W' \cdot R \cdot (F - T_B) \qquad (1)$$

where:
I: inertia applied to the wheel;
da/dt: wheel acceleration or deceleration;
W': wheel load including amount of load motion;
R: wheel radius;
$T_B$: brake torque;

Since the values of I and R in the above equation (1) can be regarded as constant, the equation (1) can be rewritten as:

$$F = \frac{c \cdot \frac{da}{dt} + bT_B}{W'} \qquad (2)$$

(c, b: constant)

Therefore, in accordance with the above equation (2), the friction coefficient F can be obtained from wheel acceleration or deceleration (da/dt), brake torque $T_B$ and wheel load W'.

Figure 2:
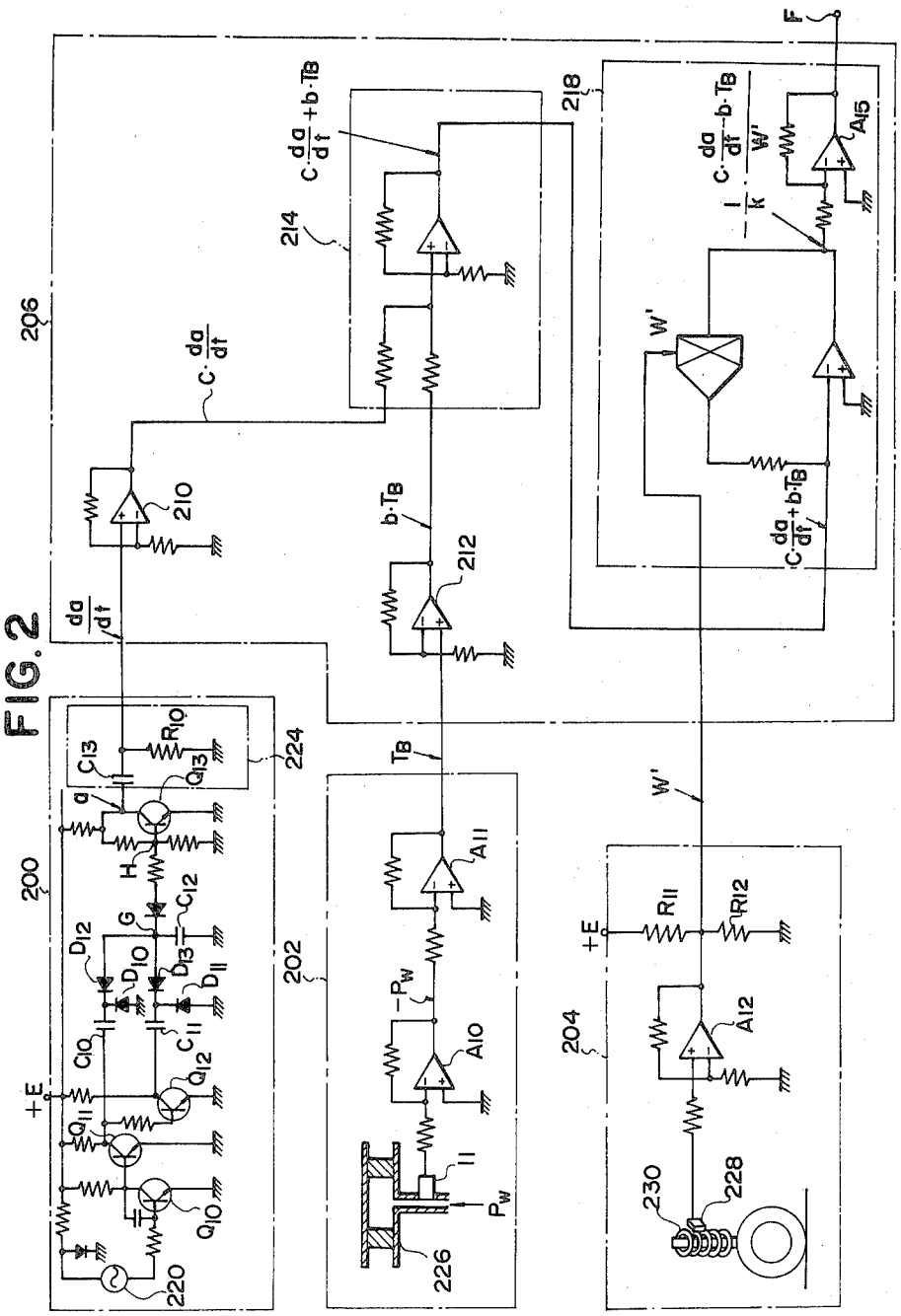
FIG. 2 is a circuit diagram of a preferred construction of a friction coefficient determining means of FIG. 1.

FIG. 2 schematically shows a preferred construction of the friction coefficient determining means 20. In FIG. 2, the reference numeral 200 denotes a wheel acceleration detector for determining wheel acceleration and deceleration speed da from a sensor signal of the wheel r.p.m. sensor 30 indicative of wheel r.p.m. a. The wheel acceleration detector 200 differentiates the sensor signal indicating wheel r.p.m. a to obtain the wheel acceleration and deceleration (da/dt). The reference numeral 202 denotes a brake torque detector. The brake torque detector 202 determines fluid pressure in the wheel cylinder. From the determined fluid pressure $P_W$, the brake torque $T_B$ is determined by the following equation:

$$T_B = 2fp \cdot B \cdot A \cdot P_W \qquad (3)$$

where
fp: friction coefficient between the brake pad and brake disc
B: diameter of brake pad
A: area of brake pad The brake torque detector 202 thus generates an output corresponding to the determined brake torque. The obtained brake torque is corrected by stress of a wheel driving shaft which is determined by a strain gauge or the like. The reference numeral 204 denotes a wheel load detector for determining wheel load W'. The wheel load detector 204 also determines the amount of load motion under braking condition by the strain gauge. The determined wheel acceleration and deceleration da/dt, brake torque $T_B$ and wheel load W' are input to an arithmetic circuit 206. The arithmetic circuit 206 arithmetically obtains the friction coefficient F from the above explained equation (2). For obtaining the friction coefficient from the several inputs, the arithmetic circuit 206 comprises an amplifier 210 for amplifying the input from the wheel acceleration detector 200 to obtain c·da/dt, an amplifier 212 for amplifying the input from the brake torque detector 202 to obtain b·$T_B$, an adder 214 for adding c·da/dt and b·$T_B$, to obtain c·da/dt+B·$T_B$, and a divider 218 for obtaining the friction coefficient by dividing the result of the addition operation of the adder by the wheel load W'.

The function of the friction coefficient determining means 20 will be described in some detail with respect to each circuit shown in FIG. 3. The wheel acceleration detecting circuit 200 comprises a wheel r.p.m. sensor 220 provided to the wheel shaft and generating alternating current having a frequency corresponding to the wheel shaft rotation speed. A transistor $Q_{10}$ is operated by the output of the wheel r.p.m. sensor 220 to turn transistors $Q_{11}$ and $Q_{12}$ on and off. In response to turning off of the transistor $Q_{11}$ and $Q_{12}$, electric charges are stored in the capacitors $C_{10}$ and $C_{11}$ through diodes $D_{10}$ and $D_{11}$. Responsive to turning on of the transistors $Q_{11}$ and $Q_{12}$, the electric charge stored in the capacitors $C_{10}$ and $C_{11}$ is transferred to a capacitor $C_{12}$ through diodes $D_{12}$ and $D_{13}$. Thus, the capacitor $C_{12}$ outputs a voltage at an output frequency which corresponds to the wheel r.p.m. determined by the wheel r.p.m. sensor 220. Accordingly, the potential at the point G is dropped to drop the potential at the base electrode of a transistor $Q_{13}$. Thereby, cut-off bias is generated at the collector electrode of the transistor $Q_{13}$ at a value substantially proportional to the output frequency of the wheel r.p.m. sensor 220. Thus, a signal indicative of wheel r.p.m. a is generated. The signal a is fed to a differentiation circuit 224 comprised of a capacitor $C_{13}$ and resistor $R_{10}$. In the differentiation circuit 224 the signal output from the transistor $Q_{13}$ is differentiated to obtain a signal indicative of acceleration of wheel speed.

The brake torque detecting means 202 comprises a pressure sensor 226 in the wheel cylinder for determining fluid pressure therein. The output of the pressure sensor is amplified by an amplifier $A_{10}$ to obtain an output corresponding to $-P_w$. The output of the amplifier $A_{10}$ is multiplied by $-k$ in an amplifier $A_{11}$ to obtain the brake torque $T_B$ from $$T_B = 2f_p \cdot B \cdot A \cdot P_w = k \cdot P_w$$

(here k is constant).

The wheel load detecting circuit 204 comprises a strain gauge 228 provided in a suspension spring 230. The strain gauge 228 determines stress applied to the suspension spring 230 to generate a signal corresponding to the determined stress. The output of the strain gauge 228 is amplified by an amplifier $A_{12}$ to obtain a signal indicative of the wheel load applied to each wheel. Further, the wheel load detecting means 204 comprises a pair of resistors $R_{11}$ and $R_{12}$ for dividing the amplified potential of the output of the strain gauge 228 to correct the output value of the strain gauge based on load applied to the suspension member below the suspension spring.

As previously described, the arithmetic circuit 206 has an amplifier 210 for amplifying the output of the wheel accelerating speed determining circuit 202 for obtaining c·da/dt and an amplifier 212 for amplifying the output of the brake torque determining circuit 204 to obtain b·$T_B$. The obtained c·da/dt and b·$T_B$ are added together. The result (c·da/dt+b·$T_B$) is divided by dividing circuit 218 to obtain a signal having a value corresponding to friction between the wheel tread and the road surface. In the arithmetic circuit 206, the amplifier $A_{15}$ is provided for multiplying the result $$\frac{c \cdot da/dt + b \cdot T_B}{W'}$$

of the dividing operation by (1/−k) to obtain the final output of the friction coefficient determining means 20, $$F = -\frac{1}{k} \frac{c \cdot da/dt + b \cdot T_B}{W'}$$

Figure 3:
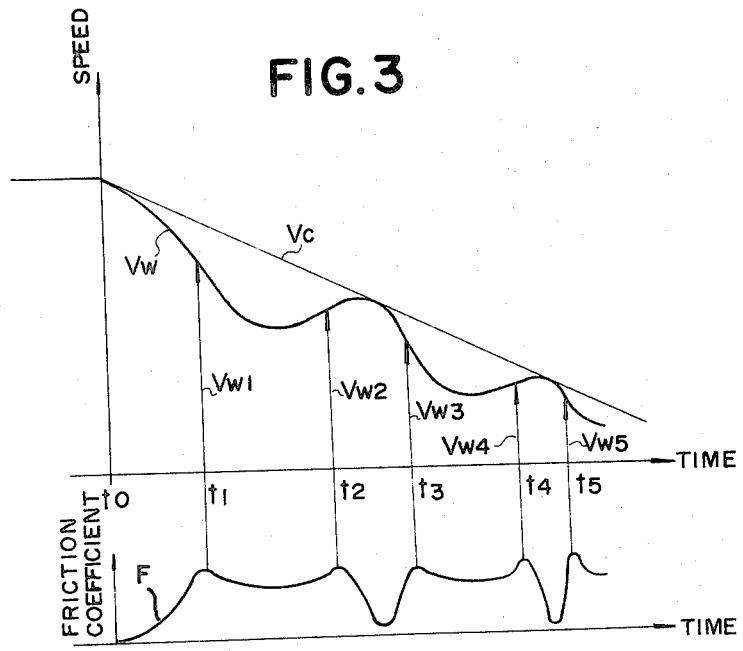
FIG. 3 is a graph showing variation of wheel r.p.m. and vehicle speed as decelerated and controlled by the brake control system of the present invention, and further showing the variation of friction coefficient between the wheel tread and the road surface.

Referring to FIG. 3, there is illustrated a graph showing the target wheel r.p.m. determining operation effected by the means of FIG. 1. In FIG. 3, the operation is shown in a form of graph. Assuming the brake is applied at the time $t_0$, the wheel r.p.m. will vary as shown by curve $V_w$. At this time, the friction coefficient F between the tire tread and the road surface also varies as represented by curve F. The varying of the friction coefficient F is sequentially determined by the friction coefficient determining means 20. The output indicative of the determined coefficient F is fed to the discriminating means 30. The discriminating means 30 detects the peaks $F_{max}$ of the friction coefficient F at times $t_1$, $t_2$, $t_3$, $t_4$, $t_5$ . . . and generates peak signal $e_s$.

It will be appreciated that generally, the peak $F_{max}$ of the friction coefficient will be detected twice in one cycle of skid control, i.e., at points wherein the slip ratio is about 15% upon both deceleration and acceleration.

Responsive to the peak signal $e_s$, the target wheel r.p.m. determining means 50 determines wheel r.p.m. $V_{w1}$, $V_{w2}$, $V_{w3}$, $V_{w4}$, $V_{w5}$ . . . at the respective times $t_1$, $t_2$, $t_3$, $t_4$, $t_5$ . . . Based on the determined wheel r.p.m., the target wheel r.p.m. determining means 50 determines a target wheel r.p.m. $V_{w0}$ within a period $t_2$ to $t_3$ so that the determined target wheel r.p.m. $V_{w0}$ is a linear function of time having an inclination given by the deceleration coefficient $-D_v/D_t = (-V_{w1} + V_{w2})/(t_1 - t_2)$ in the period $t_1$ to $t_2$. Likewise, the target wheel r.p.m. $V_{w0}$ in the period $t_3$ to $t_4$ is determined with an inclination determined by the deceleration coefficient for $V_w$ during the period $t_2$ to $t_3$. By repeating this operation the target wheel r.p.m. $V_{w0}$ is varied with an inclination corresponding to change in $V_w$, $-D_v/D_t$, for the immediately preceding period. With respect to the initial value of target wheel r.p.m. $V_{w0}$, the inclination in this period is initially separately determined.

Figure 4:
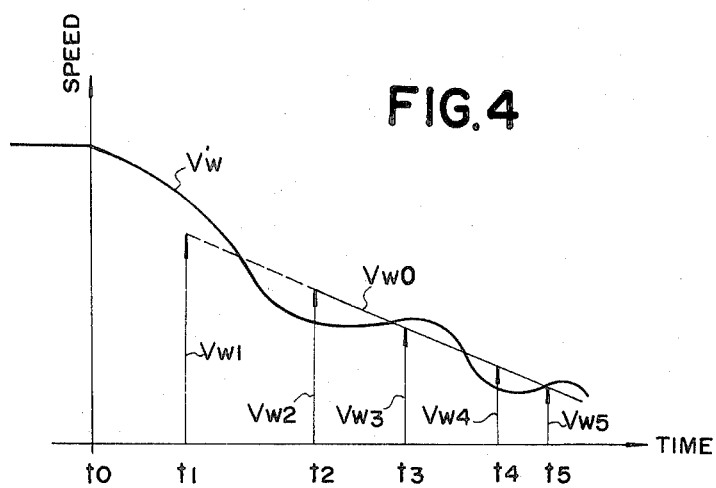
FIG. 4 is a graph showing a relationship of the wheel r.p.m. as decelerated and the target r.p.m.
Figure 5:
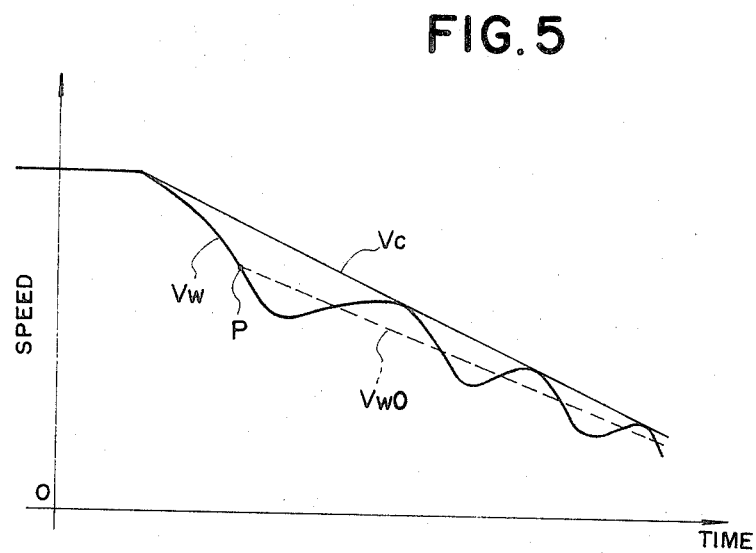
FIG. 5 is a graph showing variation of the vehicle speed and wheel r.p.m. as decelerated and controlled by a conventional brake control system.

Variation of the target wheel r.p.m. $V_{w0}$ can be seen from FIG. 4. FIG. 4 is compared with FIG. 5 in which is illustrated variation of wheel r.p.m. and vehicle speed according to a conventional brake control system. As seen from FIG. 5, the target wheel r.p.m. $V_{w0}$ is determined with a fixed inclination corresponding to a fixed value of the friction coefficient. Therefore, in the conventional brake control system, the target wheel r.p.m. $V_{w0}$ cannot always correspond to variation of the wheel r.p.m. and the vehicle speed. Contrary to this, according to the present invention, since the friction coefficient F is determined sequentially and target wheel r.p.m. corresponds to the determined friction coefficient, the target wheel r.p.m. can satisfactorily correspond to variation of wheel r.p.m. and the vehicle speed.

Based on the determined target wheel r.p.m., either one of the driving wheel and/or driven wheel or both are skid controlled to reduce the difference between actual and target r.p.m.

Figure 6:
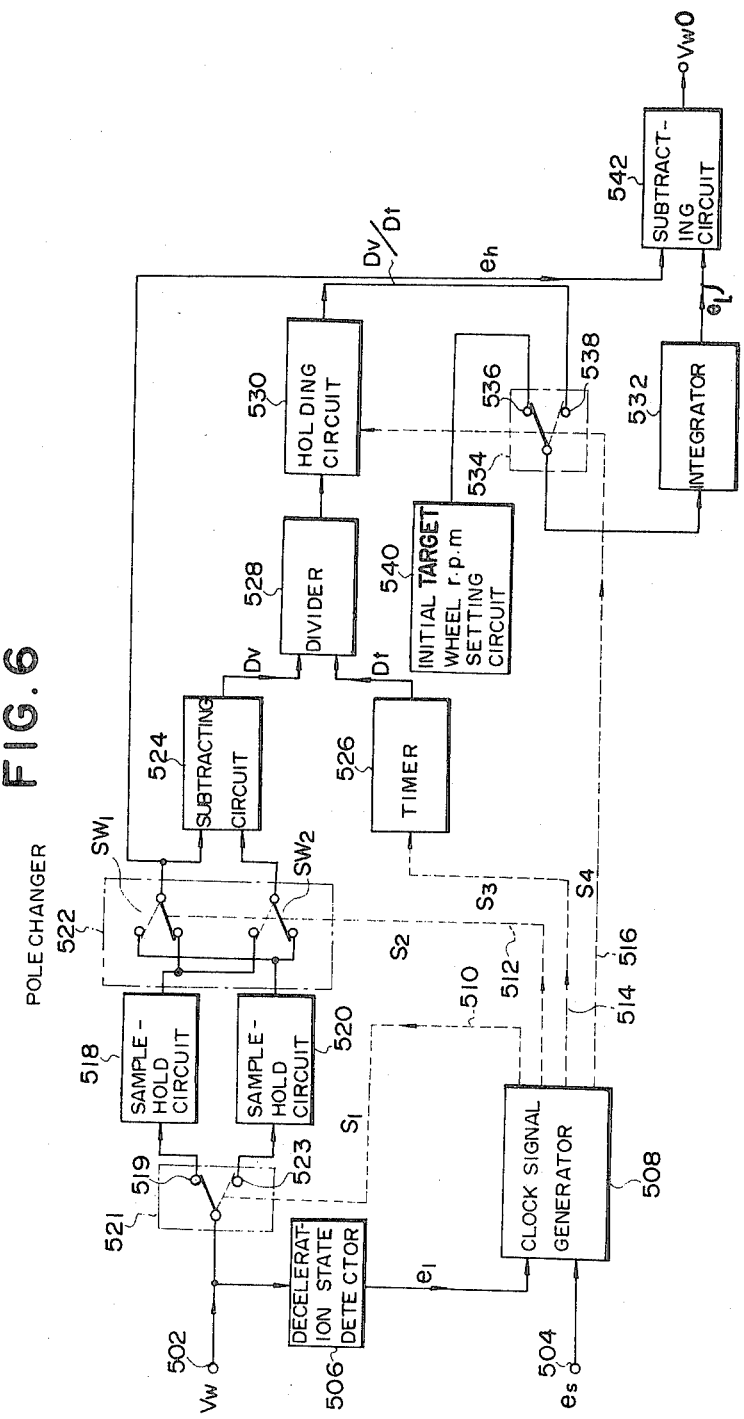
FIG. 6 is a block diagram, illustrating a preferred embodiment of a target wheel r.p.m. determining means of the brake control system of FIG. 1.

Referring now to FIG. 6, there is illustrated a detail of the target wheel r.p.m. determining means 50 of FIG. 1. The structure of the circuit shown in FIG. 6 and all functions thereof will be described hereafter with reference to the time chart of FIG. 7.

In FIG. 6, a signal $V_w$ indicative of the wheel r.p.m. determined by the wheel r.p.m. sensor 40 is input to the target wheel r.p.m. determining means 50 through an input terminal 502. On the other hand, the peak signal $e_s$ generated by the discriminating means 30 is also input to the target wheel r.p.m. determining means 50 through another input terminal 504. The signal $V_w$ is input to a deceleration state detector 506 which differentiates the signal to obtain $dV_w/dt$ and to distinguish a deceleration condition when the result of the differentiation becomes negative. The deceleration state detector 506 generates a deceleration signal $e_1$ responsive to detection of a deceleration condition. The deceleration signal $e_1$ and the peak signal $e_s$ are input to a clock signal generator 508. The clock signal generator 508 generates clock signals $S_1$ to $S_4$ to be fed through leads 510, 512, 514 and 516 as illustrated in dashed lines in FIG. 6. The clock signal $S_1$ is fed to sample-hold circuits 518 and 520 which are switched between sampling and holding modes thereby. Both of the sample-hold circuits 518 and 520 are alternately operated to hold the data indicative of wheel r.p.m. $V_w$ input from the wheel r.p.m. sensor 40. For example, in FIG. 6, the sample-hold circuit 520 is outputting an output $V_{w2}$ indicative of wheel r.p.m. $V_{w2}$ corresponding to input wheel r.p.m. $V_w$. At the same time, the sample-hold circuit 518 outputs a previously sampled value output $V_{w1}$ indicative of an earlier sampled wheel r.p.m. The outputs $V_{w2}$ and $V_{w1}$ are fed to a pole changer 522 including a pair of switches $SW_1$ and $SW_2$. The pole changer 522 changes the polarities of inputs to a subtracting circuit 524. For example, in FIG. 6, in the shown positions of the switches $SW_1$ and $SW_2$, the subtracting circuit 524 calculates $V_{w1} - V_{w2}$. The switches $SW_1$ and $SW_2$ are switched to their alternate positions in response to the clock signal $S_2$. In this switch position, the subtracting circuit 524 calculates $V_{w2} - V_{w1}$. It will be understood that the subtracting circuit subtracts the current wheel r.p.m. $V_w$ from an immediately preceding wheel r.p.m. $V_w$ to obtain $D_v$.

On the other hand, the clock signal $S_3$ generated by the clock signal generator 508 is fed to a timer 526. In response to the clock signal $S_3$, the timer 526 outputs a signal proportional to the time interval $D_t$ between occurrences of peaks of the friction coefficient $F_{max}$. The outputs from the subtracting circuit 524 and timer 526 are input to a divider 528. The divider calculates $D_v/D_t$ to obtain the deceleration coefficient of the target wheel r.p.m. $V_{w0}$. The output indicative of $D_v/D_t$ from the divider 528 is fed to a holding circuit 530. The holding circuit 530 holds the output of the divider 528 until receiving of the clock signal $S_4$ from the clock signal generator 508. The holding circuit 530 renews the held output of the divider 528 responsive to the clock signal $S_4$. The output of the holding circuit 530 is fed to an integrator 532 through a switching circuit 534. The switching circuit 534 is operative in response to clock signal $S_4$ input from the clock signal generator 508. The switching circuit 534 has two input terminals 536 and 538. The terminal 538 is connected with the holding circuit 530 and the other terminal 536 is connected with an initial decelerating inclination setting circuit 540 for pre-setting an initial deceleration coefficient $D_v/D_t$ for the first cycle of skid control. Therefore, either one of outputs of the holding circuit 530 and the initial decelerating inclination setting circuit 540 is input to the integrator 532. The integrator 532 generates a ramp signal $e_L$ corresponding to an input indicative of the inclination $D_v/D_t$ of the target wheel r.p.m. $V_{w0}$ and feeds $e_L$ to a subtracting circuit 542. The subtracting circuit subtracts the value of the ramp signal $e_L$ from the signal value $V_{w1}$ or $V_{w2}$ which are selectively input thereto. Thus, the subtracting circuit 542 calculates the target wheel r.p.m. $V_{w0}$ to be fed to a skid control circuit (not shown). Based on the target wheel r.p.m. $V_{w0}$ determined as above, the skid control means controls applying and releasing of hydraulic fluid pressure to the wheel cylinders.

Figure 7:
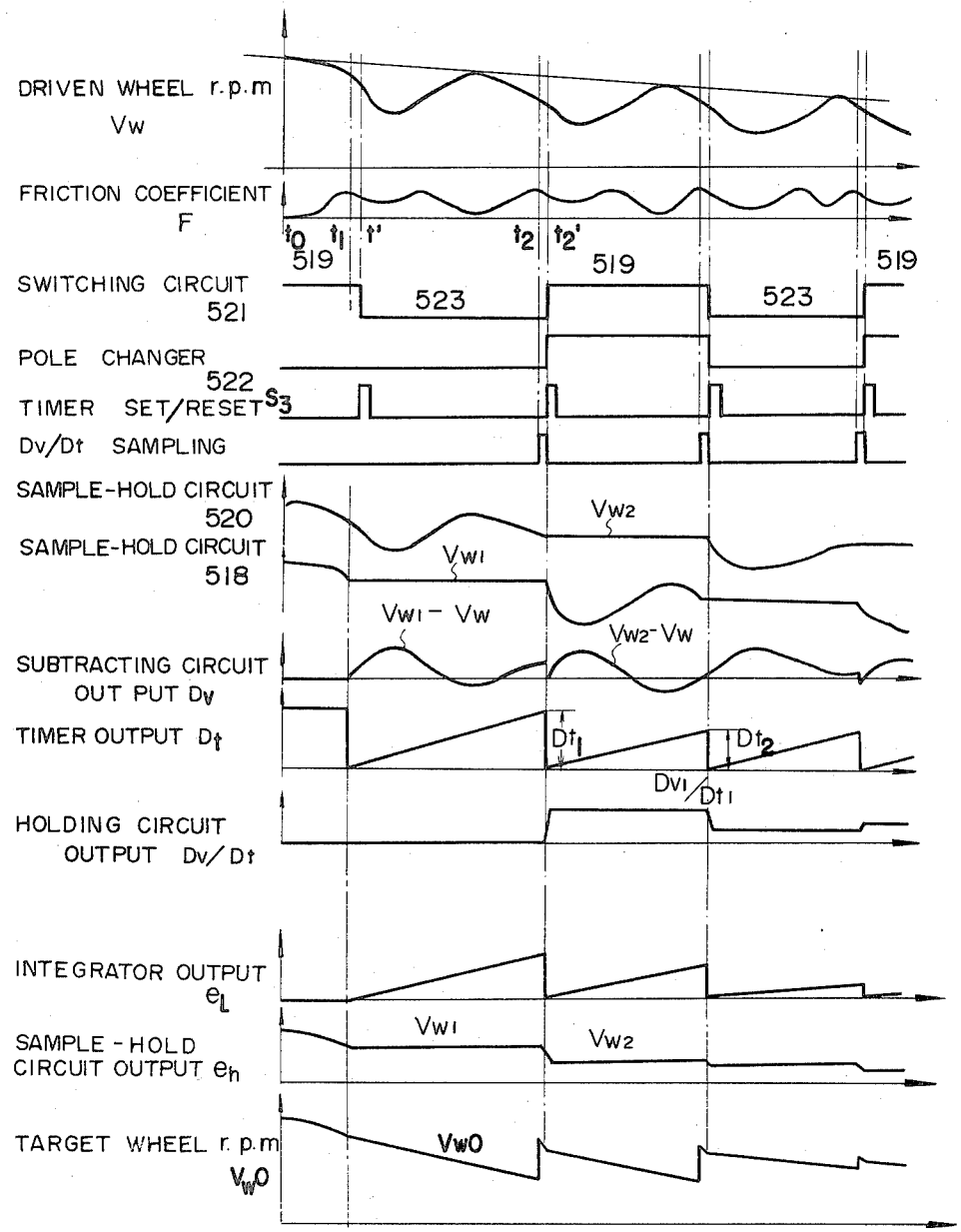
FIG. 7 is a chart of signals generated in the target wheel r.p.m. determining means of FIG. 6.

Now, the functions of the above-described circuit will be explained hereafter with reference to the time chart shown in FIG. 7.

Generally, for anti-skid control of the driving wheels, variation of the wheel r.p.m. of the driven wheel is measured. By measuring variation of the driven wheel r.p.m. $V_w$, the friction coefficient F between the wheel tread and the road surface is determined. The reason is that since the driven wheels have a smaller inertia than the driving wheels, the skid cycle of the driven wheel is substantially shorter than that of the driving wheel. Therefore, for controlling the driving wheel, the friction coefficient F can be rapidly obtained. On the other hand, as known, during one cycle of skid controlling operation, the peak of the friction coefficient is detected twice. In the shown embodiment, the deceleration state detector 506 is provided in the target wheel r.p.m. determining means 50 for picking up one of the peaks of friction coefficient in a decelerating state. However, the deceleration state detector is not always necessary for the target wheel r.p.m. determining means 50. By omitting this detector and picking up both peaks of the friction coefficient under accelerating and decelerating states, there results an increased accuracy of brake control operation.

Assuming the brake to be applied at the time $t_0$, the brake control system becomes operative for providing anti-skid control for the driven wheels. Variation of the driven wheel r.p.m. $V_w$ is determined by the wheel r.p.m. sensor 40, shown in FIG. 1. Based on the determined variation of the driven wheel r.p.m. $V_w$ and on other parameters such as wheel load, brake torque and so on, the friction coefficient determining means 20 determines the friction coefficient F. The discriminating means 30 operates to detect the peaks $F_{max}$ of the friction coefficient at a time $t_1$ and generates the peak signal $e_s$ responsive to the detections of the peak $F_{max}$. Responsive to the peak signal $e_s$ fed from the discriminator 30, the clock signal generator 508 generates the clock signal $S_1$. The clock signal $S_1$ is fed to the switching circuit 521 to change the switch position from terminal 519 to terminal 523. By this action, the sample-hold circuit 518 is caused to retain the last sampled wheel r.p.m. $V_{w1}$, fed from the wheel r.p.m. sensor 40, immediately after detection of the peak $F_{max}$ by the discriminator 30. That is, since no input is provided to the sample-hold circuit 518 after the clock signal $S_1$, it outputs a constant output value indicative of the sampled wheel r.p.m. $V_{w1}$. On the other hand, after switchover of switching circuit 521, the sample-hold circuit 520 is provided sequentially with the output of the wheel r.p.m. sensor 40, which output indicates the determined wheel r.p.m. $V_w$. During this time period, the sample-hold circuit 520 outputs an output having the same value as that of the input thereto. At the first cycle of the skid control operation, the clock signal generator 508 does not generate the clock signals $S_2$ and $S_4$. Therefore, the pole changer 522 and switching circuit 534 are maintained in the positions shown in FIG. 6. Thus, the subtracting circuit 524 outputs an output indicative of $D_v=(V_{w1}-V_w)$. The clock signal $S_3$ is generated at a time $t'$ after the sample-hold circuit 518 has sampled the wheel r.p.m. $V_{w1}$, to make the timer 526 operative.

Thus, during the first cycle of skid control operation, the result of the divider 528 is not used for anti-skid control and the pre-set value in the initial target wheel setting circuit 540 is input to the integrator 532. The integrator generates the ramp signal $e_L$ based on the input preset value and provides the same to the minus side terminal of the subtracting circuit 542. To the plug side terminal of the subtracting circuit 542 is input a sampled constant value of signal $V_{w1}$. The subtracting circuit 542 subtractively operates on the two inputs to obtain the target wheel r.p.m. $V_{w0}=V_{w1}-e_L$.

Next, assuming the peak $F_{max}$ of the friction coefficient between the wheel tread and the road surface is detected at time $t_2$, the clock signal generator 508 generates the clock signal $S_4$ responsive to the peak signal $e_s$ fed from the discriminator 30. The clock signal $S_4$ is fed through the switching circuit 534 to the holding circuit 530. Responsive to the clock signal $S_4$, the holding circuit 530 holds the deceleration coefficient $D_{v1}/D_{t1}$ at the time $t_1$. Further, responsive to the clock signal $S_4$, the switching circuit 534 is switched and therefore the holding circuit 530 is connected to the integrator 532 through the terminal 538 of the switching circuit 534. At this time, the divider outputs an output indicative of $(D_{v1}/D_{t1})=(V_{w1}-V_{w2})/(t_1-t_2)$. Therefore, corresponding to the divider output $(D_{v1}/D_{t1})$, the decelerating inclination of the target wheel r.p.m. is set in the integrator 532. The integrator 532 generates the ramp signal $e_L$ having a constant $(D_{v1}/D_{t1})$ inclination for the increasing output value of the ramp signal.

On the other hand, immediately after the time $t_2$, the clock signal generator 508 generates clock signals $S_1$, $S_2$ and $S_3$ at time $t_2'$. The clock signal $S_1$ is fed to the switching circuit 521 to change the switch position from the terminal 523 to the terminal 519. Responsive to switching of the switching circuit 521, the sample-hold circuit 520, which samples the wheel r.p.m. $V_{w2}$ until and during the term $t_2$ to $t_2'$, is caused to hold and output the constant value of signal indicative of the wheel r.p.m. $V_{w2}$ as sampled during the time $t_2$ to $t_2'$. Alternatively, after the switchover of circuit 521 at time $t_2'$, the sample-hold circuit 518 is provided sequentially with the wheel r.p.m. signal $V_w$ determined by the wheel r.p.m. sensor 40. Circuit 518 provides as its output a value corresponding to the sensor output. Therefore, since the clock signal $S_2$ causes switch $SW_1$ to transmit the output of circuit 520 to subtracting circuit 542, the constant value $V_{w2}$ of the output of the sample-hold circuit 520 is now input to the subtracting circuit 542. The subtracting circuit 542 subtracts the value $e_L$ from the input value $V_{w2}$ to obtain the target wheel r.p.m. $V_{w0}=V_{w2}-e_L$.

As mentioned above, at time $t_2'$ the clock signal $S_2$ is fed to the pole changer 522 to change the switch positions of the switches $SW_1$ and $SW_2$. By switching operation of the pole changer 522, the connection of sample-hold circuit 518 to subtracting circuit 524 is switched from the plus terminal to the minus terminal thereof and the sample-hold circuit 520 is switched to contact to the plus terminal of the subtracting circuit. Therefore, the subtracting operation executed by the subtracting circuit 522 is alternated and thus $D_v=(V_{w2}-V_w)$ is obtained. Further, the clock signal $S_3$ resets the timer 526 during the rising time thereof and makes the timer operative again for newly measuring the term from the time $t_2'$ to next time of detecting the peak $F_{max}$ of the friction coefficient. Thus, by the timer 526, the interval $D_t$ between occurrences of the peak of the friction coefficient is determined.

By repeating the above-mentioned operation for determining the target wheel r.p.m. $V_{w0}$, the driving wheels are accurately and satisfactorily anti-skid controlled according to the variation of friction coefficient between the tire tread and the road surface.

Figure 8:
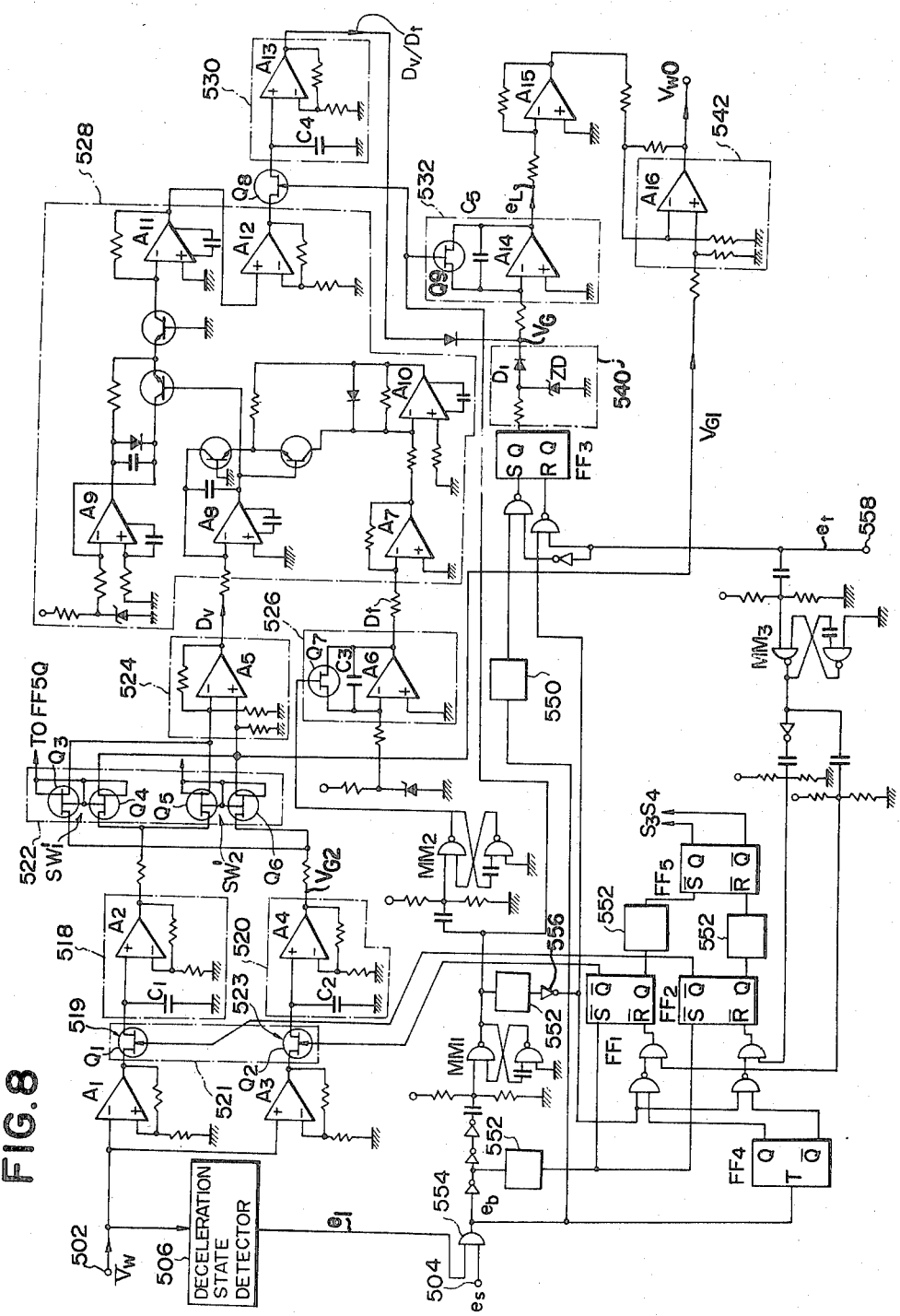
FIG. 8 is a circuit diagram of the target wheel r.p.m. determining means of FIG. 6.

Now, referring to FIG. 8, there is illustrated a circuit construction of the target wheel r.p.m. determining means 50 schematically shown in FIG. 6, according to the preferred embodiment of the present invention. Hereafter, the detailed circuit construction of the target wheel r.p.m. determining means 50 will be described with reference to corresponding parts of the circuit shown in FIG. 6. The sample-hold circuit 518 is comprised of a capacitor $C_1$ and an operational amplifier $A_2$ and the sample-hold circuit 520 comprises a capacitor $C_2$ and the operational amplifier $A_4$. Both of the sample-hold circuits 518 and 520 are connected to the input terminal 502 which receives the signal $V_w$ indicative of the wheel r.p.m. determined by the wheel r.p.m. detector 40. The connection of circuits 518 and 520 to terminal 502 is made through analog switches 519 and 523, using field effect transistors $Q_1$ and $Q_2$. Here it should be noted that operational amplifiers $A_1$ and $A_3$ are provided as buffers of the transistors $Q_1$ and $Q_2$. The switches $SW_1$ and $SW_2$ of the pole changer 522 are respectively comprised of pairs of field effect transistors $Q_4$, $Q_6$ and $Q_3$, $Q_5$. For ease in further explanation, however, the pole changer will be described in terms of commonly actuated switches $SW_1'$ and $SW_2'$, formed of transistors $Q_3$, $Q_4$ and $Q_5$, $Q_6$, respectively. As stated in the foregoing description with respect to FIG. 6, the pole changer 522 changes the input terminals of the subtracting circuit 524 which are respectively connected to the sample-hold circuits 518 and 520. The subtracting circuit 524 comprises a differential amplifier including an operational amplifier $A_5$. The differential amplifier $A_5$ generates an output indicative of the difference between the outputs of the sample-hold circuits 518 and 520, i.e. $D_v$.

On the other hand, the time interval $Dt$ between occurrences of the peak of the friction coefficient is determined by an integrator circuit which acts as timer 526. The integrator circuit comprises an operational amplifier $A_6$ and a capacitor $C_3$. Responsive to the peak signal $e_s$ fed from the discriminator 30 which is input through the input terminal 504, a transistor $Q_7$ becomes operative to reset the content of the timer 526. Outputs of the operational amplifiers $A_5$ and $A_6$ are fed to the divider 528. The divider is constructed in a well known manner and comprises operational amplifiers $A_7$ to $A_{12}$. In the divider 528, the arithmetic operation is effected to obtain the inclination $(D_v/D_t)$ of deceleration of wheel r.p.m. between successive peaks of the friction coefficient. The operational amplifier $A_{12}$ provides an output indicative of the determined inclination ($D_v/D_t$) to the holding circuit 530 through an analog switch using a transistor $Q_8$. The holding circuit comprises an operational amplifier $A_{13}$ and a capacitor $C_4$. The holding circuit 530 outputs a constant signal value indicative of the determined inclination. At this time, the switching transistor $Q_8$ is switched between on and off conditions in response to the clock signal $S_4$.

At the first cycle of skid control operation, from initially applying the brake pedal and detecting the second peak of friction coefficient, a flip-flop $FF_3$ is maintained in the set position. Thus, a Zener diode ZD outputs a signal having a constant value indicative of a preset initial target wheel r.p.m. An operational amplifier $A_{14}$ and a capacitor $C_5$ form the integrator 532, along with an analog switch comprising transistor $Q_9$. The integrator 532 generates the ramp signal $e_L$ corresponding to input provided from either the Zener diode ZD or the holding circuit 530. Subtracting circuit 542 comprises an operational amplifier $A_{16}$ for subtracting the value of the ramp signal $e_L$ from the input selectively input form one of sample-hold circuits 518 and 520 and indicative of the most recently sampled wheel r.p.m. corresponding to a peak of the friction coefficient. As a result of the subtraction operation, the subtracting circuit 542 outputs a signal indicative of the target wheel r.p.m. $V_{w0}$.

In the above-described circuit of the target wheel r.p.m. determining means, the transistors $Q_1$ and $Q_9$ are turned on and off by clock signals $S_1$ to $S_4$. The clock signal generating circuit 508 comprises flip-flops $FF_1$, $FF_2$, $FF_4$ and $FF_5$, monostable multivibrators $MM_1$, $MM_2$ and $MM_3$, rise time differentiation circuit 550 and fall time differentiation circuits 552.

Figure 9:
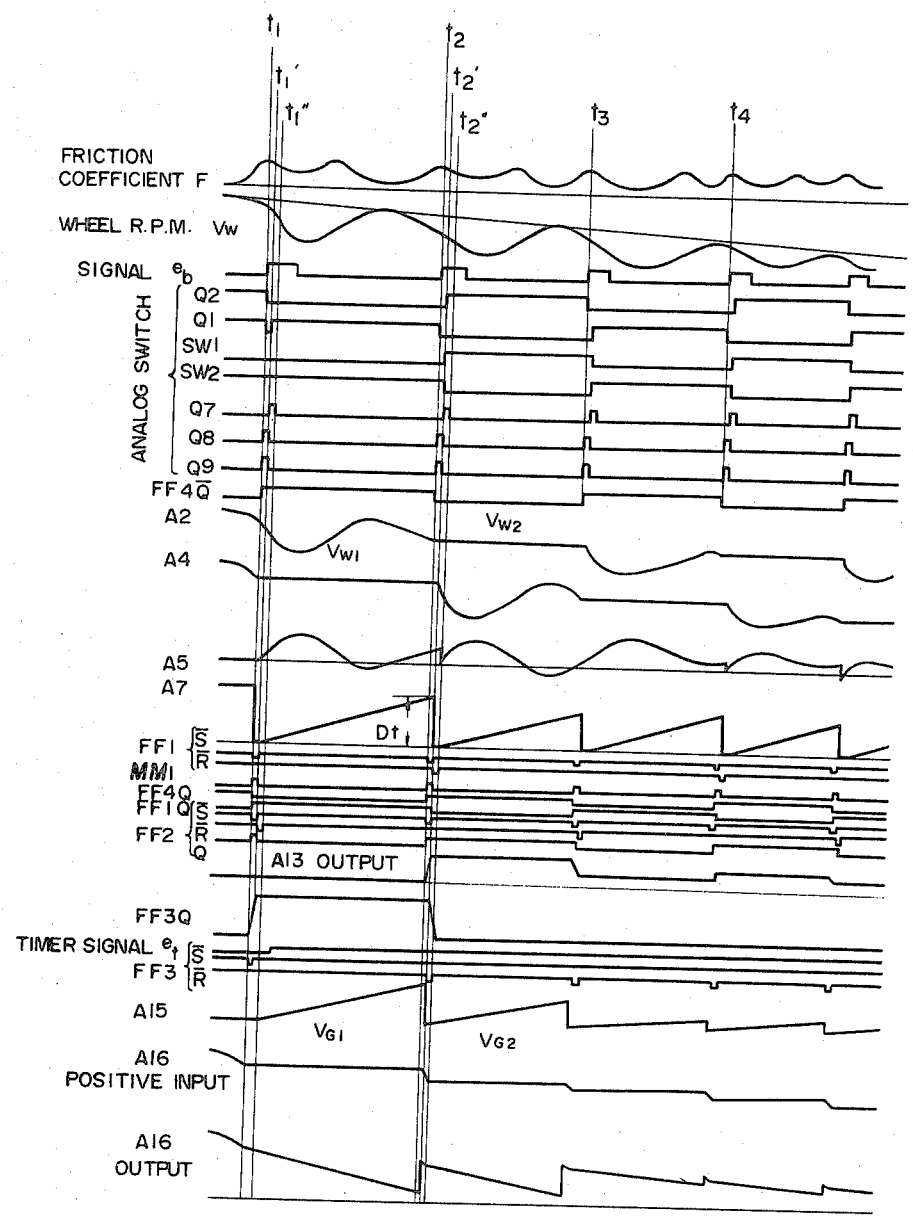
FIG. 9 is a chart of signals generated in the target wheel r.p.m. determining means of FIG. 8, which is illustrated corresponding to the chart of FIG. 7.

The function of the above-mentioned circuit of the target wheel r.p.m. determining means 50 will be described with reference to FIG. 9. FIG. 9 shows time charts of operation of each circuit of the target wheel r.p.m. determining means 50 of FIG. 8, which time chart is illustrated corresponding to FIG. 7. Now, assuming the brake to be applied at time $t_0$, the wheel r.p.m. is rapidly decelerated and the friction coefficient F attains a peak at time $t_1$. The peak $F_{max}$ of the friction coefficient is detected by the discriminator 30 and the discriminator 30 generates the peak signal $e_s$. The peak signal $e_s$ is input to the target wheel r.p.m. determining circuit 50 through the input terminal 504. The peak signal $e_s$ is input to an AND gate 554. On the other hand, the output of the wheel r.p.m. sensor 40 is input to the deceleration state detector 506. The deceleration state detector 506 differentiates the output value of the wheel r.p.m. sensor 40 and generates a signal $e_1$ when the result of the differential operation is negative, thus detecting a decelerating state of the wheel r.p.m. The signal $e_1$ is also fed to the AND gate 554. The AND gate 554 calculates a logical multiplication of the signal values of $e_s$ and $e_1$ and generates a signal $e_b$ indicative of the obtained logical product. In other words, responsive to detection of the peak $F_{max}$ of the friction coefficient, the value of the signal $e_b$ attains a high level. Responsive to rising of the signal $e_b$, the flip-flop $FF_1$ becomes set, i.e., Q=High Level $\overline{Q}$=Low Level, through the differentiation circuit 552. At this moment, the wheel r.p.m. $V_{w1}$ at the time $t_1$ is held in the capacitor $C_2$ and the output of the operational amplifier $A_4$ becomes constant with a slight delay from time $t_1$, the output of the monostable multivibrator $MM_1$ turns to high level. The output of the monostable multivibrator $MM_1$ is fed to the flip-flop $FF_2$ through a second differentiation circuit 552 and inverter 556. The flip-flop $FF_2$ is set responsive to the signal $e_b$ and is reset responsive to the output of the monostable multivibrator $MM_1$. Thus, the outputs of flip-flop $FF_2$ result in $\overline{Q}$ being at a high level and Q being at a low level. At this condition of the flip-flop $FF_2$, the analog switch $Q_1$ turns on. The operational amplifier $A_2$ outputs an output indicative of input wheel r.p.m. $V_w$ responsive to turning on of the analog switch $Q_1$.

At the first peak $F_{max}$ of the friction coefficient at time $t_1$, since the output values of the operational amplifiers $A_2$ and $A_4$ are equal to one another, the output of the operational amplifier $A_5$, which acts as differential amplifier, becomes zero. Also, the output of the operational amplifier $A_{13}$ in the divider 528 is zero. Therefore, in the first cycle of skid control operation, the initially pre-set target wheel r.p.m. $V_{w0}$ of the initial target wheel r.p.m. setting circuit 540 is used.

In anti-skid control operation, an electromagnetic actuator such as a solenoid becomes operated with a delay from the time $t_1$ for releasing the wheel cylinder and discharging fluid pressure. In synchronism with release of the wheel cylinder, a clock signal $e_t$ is input to the target wheel r.p.m. determining means 50 through an input terminal 558. At the time $t_1$, since the signal value of the clock signal $e_t$ is at a low level, the flip-flop $FF_3$ is set by the signal $e_b$. In this condition, the output terminal Q of the flip-flop $FF_3$ provides a high level potential. Responsive to this, the diode $D_1$ becomes conductive to input the constant voltage output $V_G$ of the Zener diode ZD to the operational amplifier $A_{14}$. Therefore, the capacitor $C_5$ is charged with a voltage increasing to voltage $V_G$ and thereby outputs ramp signal $e_L$. The ramp signal $e_L$ is inverted by the operational amplifier $A_{15}$ and then input to the operational amplifier $A_{16}$ of subtracting circuit 542. On the other hand, a signal $V_{G1}$ of constant value indicating the sampled wheel r.p.m. $V_{w1}$ is input to the operational amplifier $A_{16}$ through the analog switch $Q_3$, $Q_4$. Thus, by subtracting the value of the ramp signal $e_L$ from the value of the signal $V_{G1}$, the target wheel r.p.m. $V_{w0}$ is obtained.

When the output of the monostable multivibrator $MM_1$ becomes low at the time $t_1'$, the monostable multivibrator $MM_2$ becomes high to turn on the analog switch $Q_7$. Responsive to turning on of the analog switch $Q_7$, the capacitor $C_3$ discharges the charge therein to have no potential thereacross. The monostable multivibrator $MM_2$ turns to the low level at the time $t''$. At this moment, the analog switch $Q_7$ turns off and the capacitor $C_3$ starts charging the potential therein. Namely, the capacitor $C_3$ attains a potential proportional to the length of time $D_t$ from the time $t_1''$ to the next time of detecting the peak $F_{max}$ of the friction coefficient. The signal proportional to the length of the period $D_t$ is generated by the operational amplifier $A_6$ and is fed to the capacitor $C_3$.

Assuming the next peak $F_{max}$ of the friction coefficient is detected at the time $t_2$, the peak signal $e_s$ is fed to the AND gate 554 from the discriminator 30. In the same manner discussed above, the AND gate 544 generates the signal $e_b$ to reset the flip-flop $FF_4$. At this time, the flip-flop $FF_1$ is maintained in the set state and the flip-flop $FF_2$ is reset. By this, the analog switch $Q_1$ is turned off to hold the wheel r.p.m. $V_{w2}$ in the capacitor $C_1$. Therefore, the operational amplifier $A_2$ outputs a constant output value indicative of the sampled wheel r.p.m. $V_{w2}$. Since the flip-flop $FF_5$ is in a reset state and therefore the analog switch $SW_1'$ is off and the analog switch $SW_2'$ is on during the first cycle of skid control operation, the operational amplifier $A_4$ is connected to the plus side input terminal of the operational amplifier $A_5$ and the operational amplifier $A_2$ is connected to the minus side input terminal of the operational amplifier $A_5$. Therefore, the output of the operational amplifier $A_2$ indicative of the wheel r.p.m. $V_{w2}$ is input to the minus side and the output of the operational amplifier $A_4$ is input to the plus side of the operational amplifier $A_5$. The operational amplifier $A_5$ thus obtains the difference $D_v$ ($=V_{w1}-V_{w2}$) between the two inputs.

At the same time the operational amplifier $A_6$ provides an output indicative of the interval of period $Dt_1$ between the times $t''$ and $t_2$ through the operational amplifier $A_7$. The outputs of both of the operational amplifiers $A_5$ and $A_6$ are fed to the divider 528. The divider 528 calculates the ratio of its two inputs to determine the deceleration coefficient at $t_1$ ($Dv_1/Dt_1$) of the wheel r.p.m. and provides an output proportional to the determined deceleration coefficient. The output of the divider 528 is output from the operational amplifier $A_{12}$ to the holding circuit 530. During the period from $t_2$ to $t_2''$, the monostable multivibrator $MM_1$ becomes high to turn on the analog switch $Q_8$. Thus, the capacitor $C_4$ holds the outputs of the operational amplifier $A_{12}$. At time $t_2'$, the analog switch $Q_8$ is turned off responsive to lowering of the output level of the monostable multivibrator $MM_1$. Accordingly, the voltage of the capacitor $C_4$ is output through the operational amplifier $A_{13}$ as a constant value.

On the other hand, since the output of the timer 526 is high, the flip-flop $FF_3$ is reset by the signal $e_b$ at the time $t_2$ and the diode $D_1$ becomes inoperative. Therefore, the output of the Zener diode ZD is not fed to the operational amplifier $A_{14}$. At this time, the output of the operational amplifier $A_{13}$, indicative of the determined deceleration coefficient ($D_{v1}/D_{t1}$), is input to the operational amplifier $A_{14}$. Likewise to analog switch $Q_8$, the analog switch $Q_9$ is kept in an on condition during the period from $t_2$ to $t_2'$. Responsive to this, the capacitor $C_5$ discharges, to attain a zero potential thereacross.

At the time $t_2$, the output of the monostable multivibrator $MM_1$ becomes low. At this time, since the flip-flop $FF_4$ is set, the flip-flop $FF_1$ is reset. Responsive to this, the analog switch $Q_2$ turns on. Therefore, the operational amplifier $A_4$ provides an output having a value corresponding to the input wheel r.p.m. signal. Here, the reset terminal R of the flip-flop $FF_2$ is maintained at a low level potential by the input fed from the output terminal Q of the flip-flop $FF_4$. Thereby, the analog switch $Q_1$ is maintained in an off condition. Thus, the operational amplifier $A_2$ provides a constant output value indicative of the sampled wheel r.p.m. $V_{w2}$.

The flip-flop $FF_5$ is set in response to switching of the flip-flop $FF_2$. By this, the analog switch $SW_1'$ is turned on and the analog switch $SW_2'$ is turned off. Therefore, the operational amplifier $A_2$ is connected with the plus side of the operational amplifier $A_5$ and the operational amplifier $A_4$ is connected with the minus side.

Further, responsive to a high level of output of the monostable multivibrator $MM_2$ at time of $t_2''$, the analog switch $Q_7$ turns on to discharge the content of the capacitor $C_3$. Thereafter, the voltage across capacitor $C_3$ starts measuring the duration of the second cycle of skid control operation.

After the above-mentioned operation, the operational amplifier $A_{14}$ outputs the ramp signal, having a value corresponding to the output of the operational amplifier $A_{13}$, at the time $t_2''$. The output of the operational amplifier $A_{14}$ is inverted through the operational amplifier $A_{15}$ and is input to the inverting input terminal of the operational amplifier $A_{16}$.

At the same time, the output $V_{G2}$ of the operational amplifier $A_4$ as the constant value and indicative of the sampled wheel r.p.m. $V_{w2}$ is fed to the non-inverting input terminal of the operational amplifier $A_{16}$. Based on both inputs $V_{G2}$ and $e_L$, the operational amplifier $A_{16}$ determines the target wheel r.p.m. $V_{w0}$ and outputs a signal indicative of the determined target wheel r.p.m.

From the third cycle of the skid control operation, the target wheel r.p.m. determining means 50 repeats the same functions explained above with respect to the second cycle of the skid control operation. During repetition of cycles of skid control operation, the analog switches $Q_1$ and $Q_2$ are alternately and repeatedly turned on and off by function of the flip-flops $FF_1$ and $FF_2$. Likewise, the analog switches $SW_1'$ and $SW_2'$ are alternately operated by the flip-flop $FF_5$.

When the anti-skid control operation is completed, the timer output $e_t$ becomes low. Responsive to this, the output of the monostable multivibrator $MM_3$ becomes high. The flip-flop $FF_2$ is reset during the resulting rise of the output of the monostable multivibrator $MM_3$ and the flip-flop $FF_1$ is reset during the fall time of the same. As a result, the flip-flop $FF_5$ is reset. Thus, the target wheel r.p.m. determining means 50 becomes inoperative.

Figure 10:
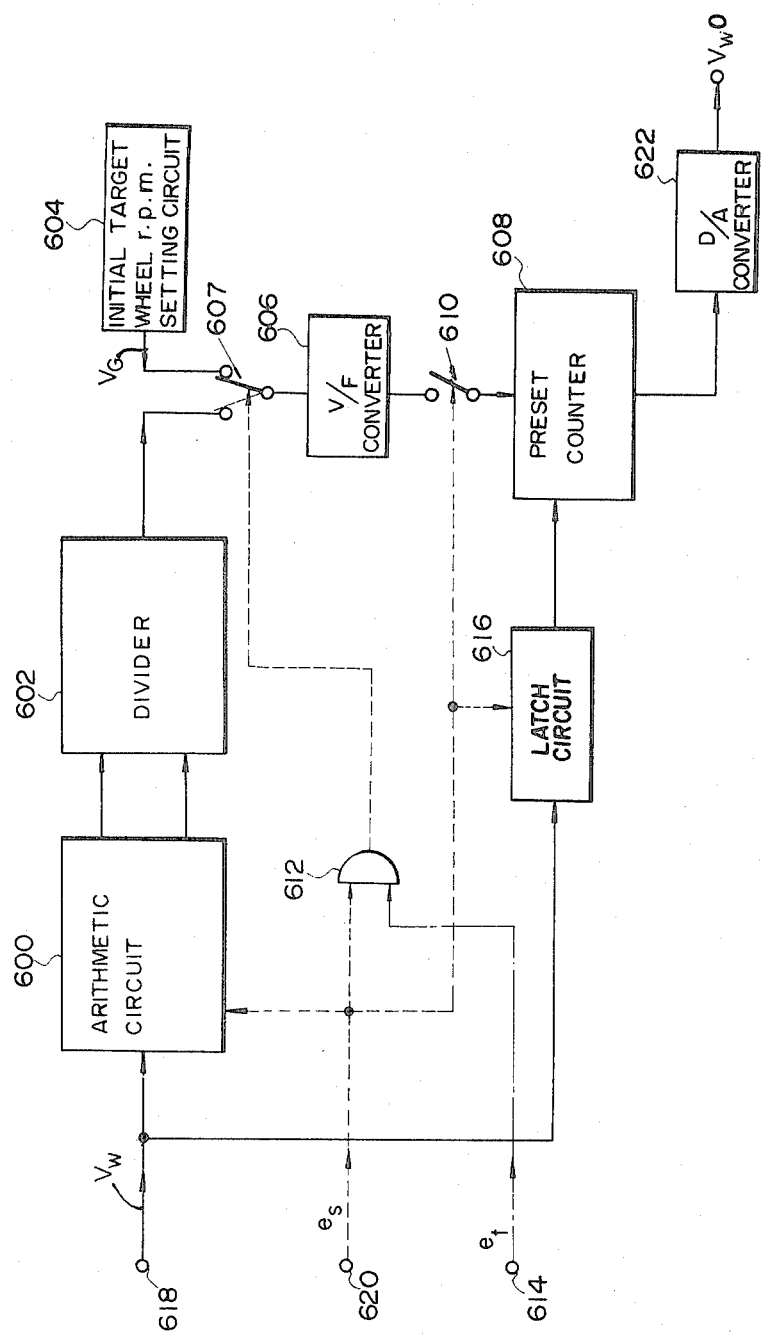
FIG. 10 is a block diagram of another embodiment of the target wheel r.p.m. determining means according to the present invention.

Now referring to FIG. 10, there is illustrated another embodiment of the target wheel r.p.m. determining means 50 according to the present invention. In the embodiment described hereinafter, the target wheel r.p.m. is determined by way of digital operation.

In FIG. 10, the reference numeral 600 denotes an arithmetic circuit for determining the difference $D_v$ of the wheel r.p.m. as varied during the period between the times the peaks $F_{max}$ of the friction coefficient are detected and for determining the length of the period $D_t$. The outputs of the arithmetic circuit 600 indicative of the determined $D_t$ and $D_v$ are input to a divider 602. The divider 602 has substantially the same circuits as shown in FIG. 8. The reference numeral 604 denotes an initial target wheel r.p.m. setting circuit for generating a signal $V_G$ having a potential corresponding to a predetermined signal wheel r.p.m. The initial target wheel r.p.m. setting circuit 604 is operable during the first cycle of skid control operation. One of the outputs of the divider 602 or the initial target wheel r.p.m. setting circuit 604 is fed to a V/F converter 606 through a switching circuit 608. The V/F converter 606 generates a pulse signal having a frequency corresponding to the value of input. The pulse signal generated by the V/F converter 606 is fed to a preset counter 608 through a switching circuit 610. The switching circuit 610 is connected with an AND gate 612. A timer signal $e_t$, generated in response to the peak signal $e_s$ and the skid control operation, is input to the AND gate 612 through an input terminal 614. The AND gate 612 provides a logical product of the peak signal $e_s$ and the timer signal $e_t$ and generates a signal corresponding to the determined logical product.

On the other hand, the input indicative of the wheel r.p.m. $V_w$ determined by the wheel r.p.m. sensor 40 is fed to a latch circuit 616 through an input terminal 618.

Further, the peak signal $e_s$ is also input to the latch circuit 616 through an input terminal 620. The latch circuit latches the wheel r.p.m. $V_w$ in response to the peak signal $e_s$ and provides an output corresponding to latched value. The pulse signal output of the latch circuit 616 is fed to the preset counter 608, which counts down the value of that output. The output of the present counter 608 is fed to a D/A converter to be converted into an analog signal indicative of the target wheel r.p.m.

The function of the above-explained circuit will be explained hereafter. When rapid braking is applied and the peak of the friction coefficient is detected by the discriminator 30, the peak signal $e_s$ is generated and fed to the target wheel r.p.m. determining means 50. Responsive to the peak signal $e_s$, the latch circuit 616 becomes operative to latch the value of the signal $V_w$ indicative of the wheel r.p.m. as input through the input terminal 618. At this time, since the difference of the wheel r.p.m. is zero and therefore the output of the arithmetic circuit 600 is zero, the output of the divider 602 is also zero. Meanwhile, responsive to the output of the AND gate, the switching circuit 607 is turned to connect the initial target wheel r.p.m. setting circuit 604 to the V/F converter 606. Therefore, the V/F converter 606 generates a pulse signal corresponding to the preset initial target wheel r.p.m.

At the same time, the peak signal $e_s$ is fed to the switching circuit 610 to turn on the same. Also, the constant output of the latch circuit 616 is fed to the preset counter 608 and preset therein. The preset value in the preset counter 608 is counted down by a pulse signal fed from the V/F counter 606.

Thus, the preset counter 608 generates a pulse signal having a frequency corresponding to the target wheel r.p.m. $V_{w0}$. The pulse signal is converted to an analog signal indicative of the target wheel r.p.m. $V_{w0}$.

In response to detection of the second peak $F_{max}$ of the friction coefficient, the timer signal $e_t$ is input to the target wheel r.p.m. determining means 50. Responsive to the timer signal $e_t$, the AND gate 612 provides an output to turn the switching circuit 607 to connect the divider 602 to the V/F converter 606. At this time, the arithmetic circuit 600 effects an arithmetic operation to obtain the difference of wheel r.p.m. $D_v (= V_{w1} - V_{w2})$ and the period $D_t$ of the first skid control operation. The divider 602 thus obtains $D_{v1}/D_{t1}$ and generates an output proportional to the determined value of deceleration coefficient $(D_{v1}/D_{t1})$. During the above-mentioned operation, the content of the preset counter 608 is cleared and preset to the wheel r.p.m. $V_{w2}$ at the time of detecting the second peak, which wheel r.p.m. $V_{w2}$ is latched in the latch circuit 616 and output therefrom as a constant value.

The output of the divider 602 is converted to a pulse signal having a frequency corresponding to the determined inclination $(D_{v1}/D_{t1})$ through the V/F converter 606. Based on the preset wheel r.p.m. $V_{w2}$ and the pulse signal fed from the V/F converter 606, the preset counter 608 generates a pulse signal corresponding to the target wheel r.p.m. $V_{w0}$. The pulse signal of the preset counter 608 is converted to an analog signal having a potential corresponding to the determined target wheel r.p.m. $V_{w0}$.

From the third skid control operation each circuit of the target wheel r.p.m. determining means repeats the same function as the above-explained second skid control operation.

Figure 11:
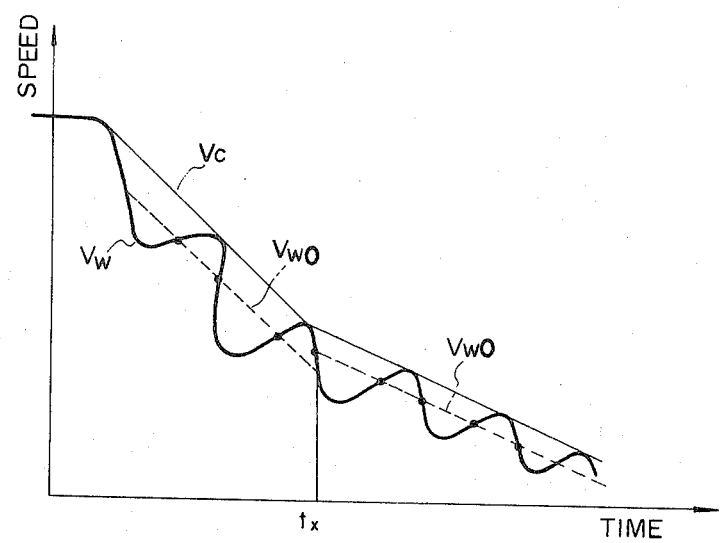
FIG. 11 is a graph showing variation of vehicle speed, wheel r.p.m. and target wheel r.p.m. as controlled by the brake control system including the target wheel r.p.m. determining means of FIG. 10.

As described above, the brake control system according to the present invention varies the target wheel r.p.m. corresponding to variation of the coefficient of friction between the wheel tread and the road surface during a skid control operation. Accordingly, even when the friction is significantly varied during the braking condition, the wheel r.p.m. is decelerated at the most effective rate to satisfactorily and effectively decelerate the vehicle, as shown in FIG. 11.

Preferably, it is the variation in the peak $F_{max}$ of the friction coefficient of the driven wheels which is used for skid controlling the driving wheel, since the skid cycle of the driven wheel is considerably earlier than that of the driving wheel. Thus, use of driven wheel data aids in providing increased accuracy of detection of the peak of the friction coefficient.

What is claimed is:

1. An anti-skid brake control system for an automotive vehicle comprising:
   first means for detecting angular velocity of a vehicle wheel to produce a first signal having a value representative of wheel r.p.m.;
   second means for detecting a peak of a road/tire friction coefficient representating friction between a road surface and a wheel tire to produce a second signal indicative of detection of said peak;
   third means, responsive to said second signal, for calculating a deceleration coefficient based on a variation in said first signal value during an interval of time between occurrences of said second signal and on the length of said interval, and for calculating a target wheel r.p.m. based on said deceleration coefficient and on a value of said first signal at the time of occurrence of said second signal, said third means producing a third signal representative of said target wheel r.p.m.; and
   fourth means for comparing said first signal value and said third signal value to release a brake pressure to be applied to a hydraulic automotive brake system when said first signal value becomes equal to or less than said third signal value.

2. A brake control system as set forth in claim 1, further comprising a fifth means responsive to release of the brake pressure to produce a fourth signal, wherein said third means comprises a first circuit means for receiving said first signal and holding a signal value of the input first signal in response to a clock signal;
   a second circuit means for receiving said fourth signal from said fifth means and for generating said clock signal responsive to said fourth signal to make said first circuit means operative to hold said signal value;
   a third circuit means for measuring an interval between occurrences of said fourth signal;
   a fourth circuit means for determining a difference between values of the current and immediately preceding first signal values held in said first circuit means and for obtaining said deceleration coefficient based on the determined difference and on the interval measured by said third circuit means;
   a fifth circuit means for generating a ramp signal having a value based on the deceleration coefficient; and
   a sixth circuit means for determining the target wheel r.p.m. by subtracting the value of said ramp signal determined by said fifth circuit means from the value of the curret first signal held in said first circuit means.

3. A brake control system as set forth in claim 2, wherein said third means further comprises:
a seventh circuit means for presetting an initial deceleration coefficient for the first cycle of skid control operation and for generating a signal representative of a preset deceleration coefficient; and
an eighth circuit means for selectively inputting signals generated in said fourth circuit means and in said seventh circuit means to said fifth circuit means, said eighth circuit means being operative to input the signal generated by said seventh circuit means in response to the first produced fourth signal and being operative to switch the input signal to said fifth circuit means from the signal generated by said seventh circuit means to a signal generated by said fourth circuit means responsive to the following fourth signal.

4. A brake control system as set forth in claim 2, wherein said fourth circuit means comprises a pair of sample-hold circuit means operating alternatively for sampling and holding said first signal, one of which outputs an output corresponding to a held first signal representative of a wheel r.p.m. value of an immediately preceding cycle of skid control operation and the other outputs an output corresponding to a current value of said first signal input thereto, a switching circuit means for selectively inputting said first signal to one of said sample-hold circuit means and a divider means receiving outputs from said sample-hold circuits for subtracting said output value corresponding to the held first signal from the output value corresponding to the current value of said input first signal value and for dividing the difference between the outputs obtained by subtraction by the value of said interval measured by said third circuit means.

5. A brake control system as set forth in claim 4, wherein said switching circuit means is operative to switch operation of said sample-hold circuits in response to said clock signal fed from said second circuit means.

6. The system as set forth in claim 1, wherein said second means comprises a variation detecting means for detecting variation of said first signal value and for calculating a rate of variation to produce a first detector signal, a pressure detecting means for detecting a fluid pressure in said brake system and for producing a second detector signal having a value representative of the fluid pressure, a load detecting means for detecting a wheel load to produce a third detector signal having a value proportional to the wheel load, and an arithmetic circuit means for determining said friction coefficient based on said first, second and third detector signals to produce a friction signal having a value representative of said road/tire friction.

7. The system as set forth in claim 6, wherein said second means further comprises a discriminator mreans for detecting variation of said friction signal value to detect a peak of said road/tire friction and for producing said second signal when said peak is detected.

8. A brake control system as set forth in claim 7, further comprising a fifth means responsive to release of the brake pressure to produce a fourth signal, wherein said third means comprises a first circuit means for receiving said first signal and holding a signal value of the input first signal in response to a clock signal;
a second circuit means for receiving said fourth signal from said fifth means and for generating said clock signal responsive to said fourth signal to make said first circuit means operative to hold said signal value;
a third circuit means for measuring an interval between occurrences of said fourth signal;
a fourth circuit means for determining a difference between values of the current and immediately preceding first signal values held in said first circuit means and for obtaining said deceleration coefficient based on the determined difference and on the interval measured by said third circuit means;
a fifth circuit means for generating a ramp signal having a value based on the deceleration coefficient; and
a sixth circuit means for determining the target wheel r.p.m. by subtracting the value of said ramp signal determined by said fifth circuit means from the value of the current first signal held in said first circuit.

9. A brake control system as set forth in claim 8, wherein said third means further comprises:
a seventh circuit means for presetting an initial deceleration coefficient for the first cycle of skid control operation and for generating a signal representative of a preset deceleration coefficient; and
an eighth circuit means for selectively inputting signals generated in said fourth circuit means and in said seventh circuit means to said fifth circuit means, said eighth circuit means being operative to input the signal generated by said seventh circuit means in response to the first produced fourth signal and being operative to switch the input signal to said fifth circuit means from the signal generated by said seventh circuit means to a signal generated by said fourth circuit means responsive to the following fourth signal.

10. A brake control system as set forth in claim 9, wherein said fourth circuit means comprises a pair of sample-hold circuit means operating alternately for sampling and holding said first signal, one of which outputs an output corresponding to a held first signal representative of a wheel r.p.m. value of an immediately preceding cycle of skid control operation and the other outputs an output corresponding to a current value of said first signal input thereto, a switching circuit means for selectively inputting said first signal to one of said sample-hold circuit means and a divider means receiving outputs from said sample-hold circuits for subtracting said output value corresponding to the held first signal from the output value corresponding to the current value of said input first signal value and for dividing the difference between the outputs obtained by subtraction by the value of said interval measured by said third circuit means.

11. A brake control system as set forth in claim 10, wherein said switching circuit means is operative to switch operation of said sample-hold circuits in response to said clock signal fed from said second circuit means.

12. A brake control system for an automotive vehicle for controlling application and release of brake pressure to a wheel cylinder to prevent a vehicle from skidding, including:
a first means for detecting wheel r.p.m. and for sequentially generating in a plurality of operating cycles a first signal indicative of the detected wheel r.p.m.
a second means for determining a coefficient of friction between a tire tread and a road surface and for generating a second signal indicative of the determined coefficient of friction, a third means for determining a target wheel r.p.m. and for generating a third signal indicative of the determined target wheel r.p.m., a fourth means for controlling application and release of brake pressure to the wheel cylinder operable to release the brake pressure when the value of said first signal drops to be equal to or less than the value of said third signal and a fifth means for detecting presence of a peak of said second signal in each cycle of skid control operation and for generating a fourth signal;

said third means being responsive to said fourth signal to hold a signal value of said first signal in each cycle of skid control operation for determining a deceleration coefficient of the wheel r.p.m. based on the held values of said first signal generated in the current cycle and in an immediately preceding cycle of skid control operation and further based on an interval between occurrences of said fourth signal, for determining a ramp signal during the next cycle of skid control indicative of deceleration of the target wheel r.p.m. in the next cycle of skid control operation and based on the determined deceleration coefficient, and for determining the target wheel r.p.m. by subtracting the value of said ramp signal from a value of said first signal obtained in response to said fourth signal.

13. In an anti-skid brake control system for an automotive vehicle for controlling application and release of brake pressure to a wheel cylinder to prevent a vehicle from skidding, which system includes a first means for detecting wheel r.p.m. and for sequentially generating a first signal indicative of the detected wheel r.p.m., a second means for determining a friction coefficient between a tire tread and a road surface and for generating a second signal indicative of the determined friction coefficient, a third means for determining a target wheel r.p.m. and for generating a third signal indicative of the determined target wheel r.p.m. and a fourth means for controlling application and release of brake pressure to the wheel cylinder operable to release the brake pressure when the value of said first signal drops to be equal to or less than the value of said third signal, a method for determining the target wheel r.p.m. comprising in combination the steps of:

determining a friction coefficient between a tire tread and a road surface;

discriminating a peak of said friction coefficient in each cycle of skid control operation and generating a peak signal responsive to detection of said peak;

holding a value of said first signal at the time of detection of said peak of said friction coefficient;

measuring an interval between occurrences of said peak signal;

determining a variation of first signal values in each said interval;

dividing said variation by the length of said interval to obtain a deceleration coefficient;

determining a value of a ramp signal based on the obtained deceleration coefficient; and subtracting said value of said ramp signal from the value of said first signal at the time of detecting said peak of said friction coefficient.

14. A method as set forth in claim 13, wherein said method further comprises the steps of:

presetting an initial value of said deceleration coefficient;

determining the value of said ramp signal in a first cycle of skid control operation based on said preset initial value of said deceleration coefficient.

15. A method as set forth in claim 14, wherein said step of determining the ramp signal value based on the preset value is carried out responsive to a first clock signal generated in response to detection of a first peak of said friction coefficient, said step of determining the ramp signal value based on the preset value terminating in response to a second clock signal generated responsive to detection of a second peak of friction coefficient.

* * * * *